United States Patent
Kelley

(10) Patent No.: US 6,223,611 B1
(45) Date of Patent: May 1, 2001

(54) BELT TRANSFER SYSTEM

(75) Inventor: Reginald D. Kelley, Lebanon, OH (US)

(73) Assignee: Force Control Industries, Inc., Fairfield, OH (US)

( * ) Notice: Subject to any disclaimer, the term of this patent is extended or adjusted under 35 U.S.C. 154(b) by 0 days.

(21) Appl. No.: 09/303,511

(22) Filed: May 3, 1999

(51) Int. Cl.[7] .............................. B65G 25/06; F16H 9/24; F16H 7/08
(52) U.S. Cl. .................. 74/89.21; 198/750.1; 474/257
(58) Field of Search ................ 74/89.21; 198/750.1, 198/748; 474/257

(56) References Cited

U.S. PATENT DOCUMENTS

| | | | |
|---|---|---|---|
| 3,952,861 | * 4/1976 | Holmqvist et al. | 198/816 |
| 4,411,182 | * 10/1983 | Borzym | 474/110 X |
| 4,518,303 | * 5/1985 | Moser | 198/750.1 X |
| 5,242,039 | 9/1993 | Mabee. | |

* cited by examiner

Primary Examiner—Allan D. Herrmann
(74) Attorney, Agent, or Firm—Jacox, Meckstroth & Jenkins

(57) ABSTRACT

A plurality of adjacent open-ended flat timing belts each has parallel spaced teeth, and opposite end portions of each belt are connected to a shuttle or carriage platform by corresponding relatively adjustable clamping blocks and plates having teeth engaging the teeth on the belts. The belts extend around a common drive sprocket having engaging teeth and formed as part of a drive shaft connected to a multiple speed drive having reversible electric motors and oil-shear clutch and brake discs. The belts also extend around a tail shaft having corresponding tail sprockets with teeth, and adjacent tail sprockets are free to rotate relative to each other. One of the clamping blocks for each belt is adjusted relative to the platform and the other clamping block for the belt to obtain the same tension in all belts so that each belt may be operated at its full rated capacity.

15 Claims, 1 Drawing Sheet

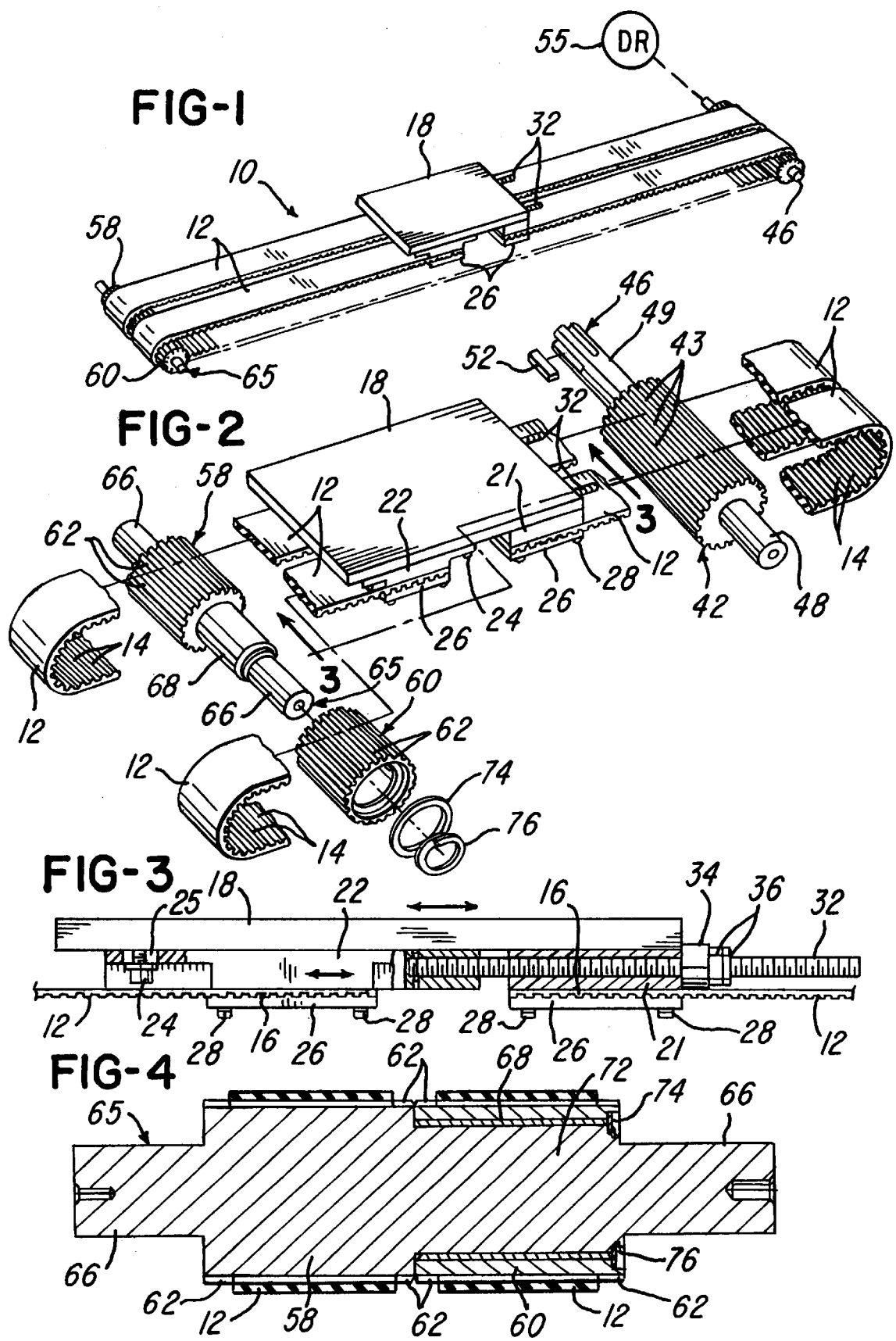

BELT TRANSFER SYSTEM

BACKGROUND OF THE INVENTION

In the rapid transfer and positioning of a shuttle or carriage which is supported for reciprocating linear movement, it is known to use an endless or open-ended flat flexible timing belt having longitudinally spaced parallel teeth. The toothed belt extends around a drive sprocket having mating teeth and connected to a drive shaft which is driven by a reversible drive. The toothed timing belt also extends around an idler or tail sprocket having mating teeth and rotatably supported by a tail shaft which extends parallel to the drive shaft. The spacing between the drive shaft and the tail shaft determine the extent of linear travel of the carriage which is commonly supported by parallel spaced tracks.

When the shuttle or carriage positioning and transfer system or apparatus is used for rapidly moving a substantial load, for example, when used with automotive assembly machinery for moving components of automotive vehicles, the load carrying capacity of the timing belt usually determines the load moving capacity of the shuttle or carriage. If two timing belts are used to move a shuttle or carriage, the variation in the belts due to production tolerances, results in one of the belts carrying a greater portion of the load than the other belt. Thus if the one belt is operated at its full rated capacity, the second belt does not significantly increase the load carrying capacity of the belt system, and primarily offers only a safety factor.

SUMMARY OF THE INVENTION

The present invention is directed to an improved carriage transfer and positioning system or apparatus which provides for rapidly moving a carriage which is capable of supporting or moving a substantial load along a linear path and for precisely positioning the carriage at predetermined locations along the linear path. In accordance with a preferred embodiment of the invention, a plurality of flat toothed timing belts are positioned in laterally adjacent relation, and each belt has opposite end portions or adjacent portions connected to the carriage by means of relative adjustable belt clamping blocks and plates. The belts extend around a common toothed drive sprocket connected to a head or drive shaft driven by a multiple speed drive preferably having multiple electric motors and oil-shear clutch and brake discs. The belts also extend around separate or corresponding toothed tail sprockets supported by a tail shaft and wherein the tail sprocket for one belt is free to rotate relative to the adjacent tail sprocket for the other belt. The tension in each belt is adjusted by relative movement by the corresponding clamping blocks in order to obtain substantially equal or uniform tension in the drive belts. The multiple flat toothed belts not only provide a safety factor but provide for moving a substantially greater load with the carriage by operating each belt at its full rated capacity.

Other features and advantages of the invention will be apparent from the following description, the accompanying drawing and the appended claims.

BRIEF DESCRIPTION OF THE DRAWING

FIG. 1 is a diagrammatic perspective view of carriage transfer and positioning apparatus constructed in accordance with the invention;

FIG. 2 is a fragmentary exploded view of the apparatus shown in FIG. 1;

FIG. 3 is a fragmentary section of the apparatus, taken generally on the line 3—3 of FIG. 2; and FIG. 4 is an axial section of the tail shaft and sprocket assembly shown in FIGS. 1 & 2.

DESCRIPTION OF THE PREFERRED EMBODIMENT

FIG. 1 illustrates diagrammatically a belt positioning and transfer system or apparatus 10 which includes a plurality or pair of flexible flat timing belts 12 each having parallel spaced and laterally extending teeth 14. Preferably, each toothed belt 12 is open-ended and has opposite end portions 16 (FIG. 3) connected to a carriage member or platform 18 by a fixed attachment block or belt clamping block 21 and an adjustable attachment block 22. The block 21 is rigidly secured to the platform 18, and the block 22 is connected to the platform by a set of four screws 24 which extend through slots 25 within the block 22 to provide for adjustment of the block 22 relative to the block 21 and the platform 18. The opposite end portions 16 of each belt 12 are positively attached to the blocks 21 and 22 by corresponding clamping plates or belt gripping members 26 and a set of four screws 28. Each of the clamping plates 26 has parallel spaced teeth which mate with and engage the teeth 14 on the corresponding belt 12 to provide a high strength and positive connection of the belt end portions to the carriage platform 18.

As shown in FIGS. 2 & 3, a threaded adjusting bolt or rod 32 extends through a clearance bore within each belt attachment block 21 for each belt 12 and has an inner end portion threadably connected to the corresponding adjustable belt attachment block 22. A thrust washer 34 is mounted on each adjustment rod 32, and a set of jamb nuts 36 are threaded onto the rod adjacent the washer 34. In order to adjust and select the tension in each belt 12, the screws 24 are loosened, and the nuts 36 are rotated to adjust the belt attachment block 22 relative to the belt attachment block 21. After the desired tension is obtained, the screws 24 are again tightened.

Referring to FIGS. 1 & 2, the two adjacent drive belts 12 extend around a toothed drive pulley or sprocket 42 having peripherally spaced teeth 43 which engage the teeth 14 on the two belts 12. The sprocket 42 is integrally connected to a head or drive shaft 46 having opposite end journals 48 and 49 which are rotatably supported by anti-friction bearings (not shown) retained within a housing or bracket (not shown). The drive shaft 46 is coupled with a key 52 to the output shaft of multiple speed drive 55 preferably having two electric motors and a set of oil-shear clutch discs and a set of oil-shear brake discs which are actuated separately by air pistons or electro-magnetic coils. For example, the drive 55 may be constructed as disclosed in U.S. Pat. No. 5,242,039 which is owned by the assignee of the present invention and the disclosure of which is herein incorporated by reference. Preferably, the drive shaft 46, including the journals 48 and 49, and the sprocket 42 are all formed from a one-piece solid steel cylindrical bar or rod.

As also shown in FIGS. 1 & 2, the belts 12 extend around separate or corresponding tail pulleys or sprockets 58 and 60 each of which has peripherally spaced teeth 62 which mate with the teeth 14 on the belts 12. Referring to FIG. 4, the sprocket 58 is formed as an integral part of a tail shaft 65 which has opposite end journals 66 rotatably supported by anti-friction bearings (not shown) retained within a housing or bracket (not shown). The tail sprocket 60 is annular and is rotatably supported by a cylindrical sleeve bushing or bearing 68 mounted on a reduced cylindrical portion 72 of the tail shaft 65. Thus the tail sprocket 60 is free to rotate on the tail shaft 65 and relative to the tail sprocket 58 formed as an integral part of the tail shaft 65. The annular tail sprocket 60 and bearing 68 are retained on the reduced shaft portion 72 by a thrust washer 74 and a retaining ring 76.

As a result of the slight variations in the belts 12 due to manufacturing tolerances, it is apparent that the free rotation of the tail sprocket 60 relative to the tail sprocket 58 provides for independently adjusting the tension in each belt 12. Thus the belts may be adjusted to the same tension by adjusting each attachment block 22 relative to its corresponding attachment block 21 with the adjustment nuts 36 on the corresponding connecting rod 32. When both of the belts are operated at substantially the same tension, the load is distributed uniformly on the belts. Thus the load carrying capacity of the belts 12 may be combined in order to transfer and position a substantial load without exceeding the rated capacity of any belt.

The freely rotatable tail sprocket 60 also permits easier assembly of the belts 12 onto the head or drive shaft 46 and the tail shaft 65. As indicated above, it is also apparent that more than two toothed timing belts 12 and corresponding tail sprockets 60 may be used along with a longer drive shaft 46 and tail shaft 65 in order for the carriage to transfer and position an even greater load. While the timing belts 12 are illustrated and described as being open-ended belts, it is also apparent that each belt may be endless and have a slight loop between the corresponding attachment plates 26.

While the form of transfer and positioning apparatus herein described constitutes a preferred embodiment of the invention, it is to be understood that the invention is not limited to this precise form of apparatus, and that changes may be made therein without departing from the scope and spirit of the invention as defined in the appended claims.

What is claimed is:

1. A carriage transfer and positioning apparatus comprising a carriage member supported for linear movement, a plurality of elongated flexible belts each having longitudinally spaced teeth, relatively adjustable belt gripping members connecting spaced portions of each said belt to said carriage member, an adjustment member for moving one of said belt gripping members for each said belt relative to the other said belt gripping member for adjusting the tension in each said belt, each of said belts extending around a toothed drive sprocket rigidly connected to a drive shaft, a power operated reversible drive connected to rotate said drive shaft in opposite directions, each of said belts also directed around a corresponding toothed tail sprocket supported by a tail shaft, and one of said tail sprockets being supported by said tail shaft for rotation relative to the other said tail sprocket.

2. Apparatus as defined in claim 1 wherein each of said belts is open-ended and has opposite end portions clamped by corresponding said gripping members to said carriage member.

3. Apparatus as defined in claim 1 wherein one of said belt gripping members for each said belt comprises a belt clamping plate having parallel spaced teeth.

4. Apparatus as defined in claim 1 wherein said adjustment member for each said belt comprises a threaded rod connected to a belt clamping block and extending in the direction of linear movement of said carriage member.

5. Apparatus as defined in claim 1 wherein said other tail sprocket for each said belt is integral with said tail shaft, and said one tail sprocket is rotatable on said tail shaft.

6. Apparatus as defined in claim 5 wherein said tail shaft has opposite end journals projecting outwardly from said tail sprockets to support said tail shaft for rotation.

7. Apparatus as defined in claim 1 wherein said drive sprocket is integral with said drive shaft, and said drive shaft has opposite integral end journals projecting outwardly from said drive sprocket.

8. Apparatus as defined in claim 1 wherein said reversible drive comprises a multiple speed drive unit including a plurality of electric motors, a stack of oil-shear clutch discs, and a stack of oil-shear brake discs.

9. A carriage transfer and positioning apparatus comprising a carriage member supported for linear movement, a plurality of elongated flexible flat timing belts each having longitudinally spaced and laterally extending teeth, relatively adjustable belt gripping members connecting spaced portions of each said belt to said carriage member, an adjustment member for moving one of said belt gripping members for each said belt relative to the other said belt gripping member for adjusting the tension in each said belt, each of said belts extending around a toothed drive sprocket rigidly connected to a drive shaft, a power operated reversible drive connected to rotate said drive shaft in opposite directions, said drive including at least one electric motor and a stack of oil-shear clutch discs and a stack of oil-shear brake plates, each of said timing belts also directed around a corresponding toothed tail sprocket supported by a tail shaft, and one of said tail sprockets being supported by said tail shaft for rotation relative to the other said tail sprocket for obtaining substantially uniform tension in said belts.

10. Apparatus as defined in claim 9 wherein each of said belts is open-ended and has opposite end portions clamped by corresponding said gripping members to said carriage member.

11. Apparatus as defined in claim 9 wherein one of said belt gripping members for each said belt comprises a belt clamping plate having parallel spaced teeth.

12. Apparatus as defined in claim 9 wherein said adjustment member for each said belt comprises a threaded rod connected to a belt clamping block and extending in the direction of linear movement of said carriage member.

13. Apparatus as defined in claim 9 wherein said other tail sprocket for each said belt is integral with said tail shaft, and said one tail sprocket is rotatable on said tail shaft.

14. Apparatus as defined in claim 9 wherein said drive sprocket is integral with said drive shaft, and said drive shaft has opposite integral end journals projecting outwardly from said drive sprocket.

15. A carriage transfer and positioning apparatus adapted for reciprocating a heavy load, said apparatus comprising a carriage member supported for linear movement, a plurality of elongated flexible belts each having opposite end portions and longitudinally spaced teeth, relatively adjustable belt gripping members connecting said opposite end portions of each said belt to said carriage member, an adjustment member on said carriage for moving one of said belt gripping members for each said belt relative to the other said belt gripping member for adjusting the tension in each said belt, each of said belts extending around a toothed drive sprocket rigidly connected to a drive shaft, a power operated reversible drive connected to rotate said drive shaft in opposite directions, each of said belts also directed around a corresponding toothed tail sprocket supported by a tail shaft, and one of said tail sprockets being supported for rotation relative to the other said tail sprocket for obtaining substantially uniform tension in said belts and optimum use of said belts.

* * * * *